United States Patent [19]

Prosnitz et al.

[11] Patent Number: 4,510,455

[45] Date of Patent: Apr. 9, 1985

[54] TWO-DIMENSIONAL OPTIMIZATION OF FREE ELECTRON LASER DESIGNS

[75] Inventors: Donald Prosnitz, Walnut Creek; Roger A. Haas, Pleasanton, both of Calif.

[73] Assignee: The United States of America as represented by the United States Department of Energy, Washington, D.C.

[21] Appl. No.: 374,655

[22] Filed: May 4, 1982

[51] Int. Cl.³ .............................................. H01S 3/10
[52] U.S. Cl. .......................................... 330/4.3; 372/2
[58] Field of Search ............................. 330/4.3; 372/2

[56] References Cited

PUBLICATIONS

Prosnitz et al, "A Two-Dimensional . . . ", 6/25/81, pp. 1047-1069, 3rd Workshop on FEL Devices, Addison-Wesley.

Primary Examiner—Nelson Moskowitz
Attorney, Agent, or Firm—John F. Schipper; Charles E. Lykes, Jr.; Judson R. Hightower

[57] ABSTRACT

Off-axis, two-dimensional designs for free electron lasers that maintain correspondence of a light beam with a "synchronous electron" at an optimal transverse radius $\bar{r} > 0$ to achieve increased beam trapping efficiency and enhanced laser beam wavefront control so as to decrease optical beam diffraction and other deleterious effects.

6 Claims, 5 Drawing Figures

TWO-DIMENSIONAL OPTIMIZATION OF FREE ELECTRON LASER DESIGNS

FIELD OF THE INVENTION

The invention relates to realistic, two-dimensional designs for coherent amplification of electromagnetic radiation by interaction of a relativistic free electron beam and a parallel beam of light. The United States Government has rights in this invention, pursuant to Contract W-7405-ENG-48 between the U.S. Department of Energy and the University of California Lawrence Livermore National Laboratory.

BACKGROUND OF THE INVENTION

The possibility of producing amplified coherent electromagnetic radiation, by collinear passage of the radiation and of a relativistic electron beam through a sequence of electric or magnetic fields of alternating polarity, has been recognized since the first publication by H. Motz, Journal of Applied Physics 22 527 (1951) on the subject. Motz considered a sequence of alternating direction magnetic fields, regularly spaced and transversely oriented relative to the common direction of travel of light beam and electron beam, Let $L_o$ be the fundamental period of variation of direction of the sequence of transverse magnetic fields and let the beam electrons move with velocity $v \cong c$. Photons will be emitted by the electrons, at a frequency $\nu$ which will depend upon angle of observation $\theta$ relative to the common beam direction according to $\nu = (V/L_o)(1 - \cos\theta)$. For a highly relativistic electron beam and modest transverse magnetic field stengths, most of the radiation appears in the forward direction, in a narrow cone of half angle of the order of $$\Delta\theta = m_e c^2/E_b \text{ where } E_b = m_e c^2/\sqrt{1 - (v/c)^2}$$

is the electron total energy. This approach requires a bunched electron beam with sinusoidally varying orbit, and the Motz analysis is essentially classical and relativistic.

Motz, Thon and Whitehurst, in Jour. of Appl. Phys., 24 826 (1953), further considered the co-propagating light beam and electron beam in a waveguide, obtained some interesting general classical relativistic relationships for electron orbits in a spatially varying B-field, and reported the experimental observation of visible and millimeter wavelength radiation for field strengths $B \approx 3,900$ and $5,600$ Gauss.

K. Landecker, in Physical Review 86 852 (1951) proposes up-conversion of the frequency of a substantially monochromatic electromagnetic wave by reflection of the wave from a parallel relativistic electron beam moving in the opposite direction, somewhat analogous to reflection of a beam of light by a mirror moving at relativistic velocity.

In *Proceedings of the Symposium on Millimeter Waves* (Polytechnic Press, Brooklyn 1960) p. 155, Motz and Nakamura analyzed the amplification of a millimeter wavelength em. wave interacting with a relativistic electron beam in a rectangular waveguide and a spatially oscillatory magnetic field, using a model of J. R. Pierce. The analysis was purely classical, and the gain was rather modest.

Pantell, Soncini and Puthoff discuss some initial considerations on stimulated photon-electron scattering in I.E.E.E. Journal of Quantum Electronics QE-4 905 (1968). Collinear scattering, with the incident photon energy h being $<<$ incident electron energy $E_{e1}$ and periodic deflection of the electron beam by a microwave radiation field, is analyzed briefly; and a Compton scattering laser is proposed, using the input/output wavelength relation $\nu_{out} = 4(E_{e1}/m_e c^2)^2 \nu_{in}$. Useful gain from the device appears to be limited to the middle-high infrared frange $\lambda > 20$ $\mu$m.

Mourier, in U.S. Pat. No. 3,879,679, discloses a Compton effect laser that proceeds from the same principles as Pantell et al, supra. This invention, like that of Pantell et al, appears to require provision of an electron storage ring or the like for rapidly moving electrons and an optical cavity that is a part of the ring, for causing electron-photon scattering.

R. M. Phillips, in I.R.E. Transactions on Electron Devices, 231 (October 1960), used a periodic magnetic field, whose period may vary, to focus and axially bunch an electron beam traveling in an unloaded waveguide, together with a monochromatic light beam, to increase light beam energy at the expense of electron beam kinetic energy. The electron beam velocity was adjusted so that a beam electron travels one period L along its trajectory in the time required for the light beam (of wavelength $\lambda$) to travel a distance $L + \lambda$. The electron then senses only the retarding porition or only the accelerating portion of the electromagnetic wave. This approach converts transverse momentum, arising from the presence of the electromagnetic wave, into changes in axial momentum of the electron beam so that beam bunching occurs.

J. M. J. Madey, in Journal of Applied Physics 42 1906 (1971), discusses stimulated emission of bremsstrahlung by a relativistic electron into a single electromagnetic mode of a parallel light beam, where both electron and light beam move through a periodic, transverse d.c. magnetic field. Quantum mechanical and semi-classical calculations of transition rates and gain indicate that finite, practical gain is available in the infrared and visible portions of the optical spectrum. These considerations are incorporated in U.S. Pat. No. 3,822,410, issued to Madey for tunable apparatus for generation/amplification of coherent radiation in a single or a few closely spaced electromagnetic modes.

Elias, Fairbank, Madey, Schwettman and Smith, in Physical Review Letters 36 717 (1976), have reported experimental gain of 7% per pass length of 5.2M, using an optical beam of wavelength $\lambda = 10.6$ $\mu$m from a $CO_2$ laser interacting with a relativistic electron beam ($E_e \approx 24$ MeV) having an associated peak current of 70 milliamps in the presence of a periodic magnetic field of wavelength 3.2 cm and strength $B = 2.4$ kiloGauss, using a conventional free electron laser approach.

Deacon, Elias, Madey, Ramian, Schwettman and Smith, in Physical Review Letters 38 892 (1977), returned to the same configuration used by Elias et al above, using an optical beam of wavelength $\lambda = 3.417$ $\mu$m, a relativistic electron beam of energy $E_e + 43.5$ MeV and an optical cavity length of 12.7M, and report the first operation of a free electron laser oscillator, operated above threshold. Gain is modest and depends upon system length.

McDermott, Marshall, Schlesinger, Parker and Granatstein report on a different experimental approach to free electron laser operation in Physical Review Letters 41 1368 (1978), using stimulated Raman backscattering in the presence of a periodic magnetic field ($\lambda_w \approx 0.8$ cm). Using a 40 nsec electron beam pulse length from an accelerator and an optical cavity of length L=150 cm, four round trip passes of the electromagnetic radiation are made for a single e-beam pulse, thus approaching conventional laser performance. Coherence of the laser signal is improved by an order of magnitude over the estimated single pass, super-radiant value of $\Delta\lambda_s/\lambda_s = 10-20\%$; and the laser output power (0.5–1.0 Megawatt) and (high) gain are no longer strongly dependent upon system length. The wiggler had a length of 40 cm and a strength $B \approx 400$ Gauss.

Hirshfield, in U.S. Pat. No. 3,398,376 for a relativistic electron cyclotron maser, discloses and claims use of an axial, monoenergetic relativistic electron beam ($E_{kinetic} \approx 5$ keV) a spatially-varying longitudinal magnetic field coaxial with the beam, a weaker, transverse periodic electric or magnetic field with a resulting helical pitch matching that of the electron motion at the predetermined beam velocity and a cavity resonator with a mode frequency matching that of the cyclotron frequency of the resulting spiraling electrons. The apparatus relies upon electron cyclotron radiation.

A combination free electron laser/gas laser with high pulse repetition rates is taught by U.S. Pat. No. 4,189,686, issued to Brau, Rockwood and Stern. In the embodiment disclosed, the free electron laser operates at ultraviolet wavelengths. The monoenergetic electron beam is initially bunched and accelerated to $\approx 10$ MeV kinetic energy and directed into and out of a multiplicity of serially arranged free electron lasers by turning magnets positioned at the ends of these lasers; finally, the electron beam is directed axially through a gas laser to utilize and convert additional electron beam energy to electromagnetic energy. The free electron laser appears to be of conventional form, utilizing fixed period magnetic fields to produce electron bremsstrahlung radiation and an optical resonator for light beam amplification.

SUMMARY OF THE INVENTION

The subject invention is a method for amplification of optical radiation in an off-axis design, taking account of the variation of the laser and magnetic field variables with longitudinal coordinate z and radial coordinate r.

One object of the invention is to provide off-axis designs for a free electron laser system.

Another object is to provide a method for improved efficiency of electron beam trapping in a free electron laser system.

Another object is to provide a means to control the shape of the laser radiation wavefront as it exits the free electron laser. This permits control of the laser beam divergence so that the beam may be propagated over greater distances or focused onto a small target.

Other objects of the invention, and advantages thereof, will become clear by reference to the detailed description and the accompanying drawings.

To achieve the foregoing objects in accordance with the invention, the method comprises the steps of providing a transverse, wiggler magnetic field perpendicular to the laser beam propagation direction or z-axis, the magnetic field having local field strength $B_w = \sqrt{2}$ mc $b_w/e$ and local period $\lambda_w = 2\pi/k_w$, where e is the unit of electron charge and $mc^2$ is electron rest energy, propagating an optical radiation field of predetermined wavelength $\lambda_s = 2\pi/k_s = 2\pi c/\omega_s$ and local electric field strength $E_s = \sqrt{2}$ $mc^2 e_s/e$ along the predetermined z-axis; directing a collimated beam of electrons having relativistic energy initially exceeding 2 MeV along the predetermined axis in timed relationship with the propagation of the optical radiation so that the phase angle $\psi = \int(k_s + k_w)dZ - \omega_s t + \phi$ associated with the electron beam is substantially constant at an optimal, non-zero radius, measured transversely from the predetermined z-axis. The optimal radius for any particular FEL design is determined by maximizing the trapping efficiency parameter $$n_t = \frac{P_o}{2(\gamma_{initial} - \gamma_{final}) mc^2 i_e}$$

$P_o$ is laser output power and $i_e$ is initial electron beam current.

DETAILED DESCRIPTION

Figure 1:
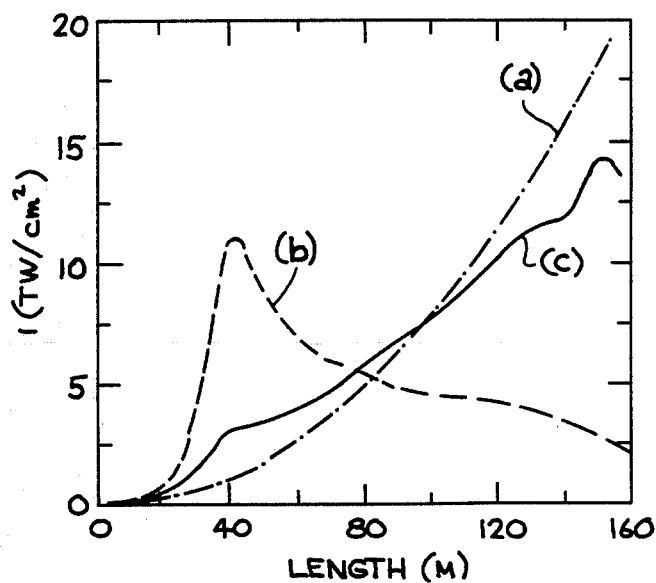
FIG. 1 is a graphic view of laser intensity as a function of free electron laser (FEL) amplifier length as predicted by a one-dimensional model (a), by a two-dimensional model with design radius $r_d = 0$ cm (b), and a two-dimensional model with a design radius $r_d = 0.175$ cm (c), all for the radiation wavelength $\lambda_s = 0.25$ μm.

Laser amplification in a tapered wiggler FEL, with magnetic field strength $B_w$ and magnetic field period $\lambda_w$ varying with longitudinal coordinate z, is accomplished by trapping electrons from a relativistic beam in a potential well (a "bucket") that is created by the joint action of the wiggler field $B_w$ and the electric field $E_s$ of the co-propagating laser beam. Kinetic energy of the trapped electrons is converted to radiative energy at the laser frequency $\nu_s$ by controlled electron bremsstrahlung in the presence of the varying magnetic field. The wiggler field may be chosen so that synchronism is maintained at one radial position, and the potential well will be less effective at other radial positions. The (one-dimensional) FEL is discussed in more detail in co-pending U.S. patent application Ser. No. 342,679 filed Jan. 26, 1982, by D. Prosnitz and A. Szoke and Ser. No. 342,680, filed Jan. 26, 1982, filed by A. Szoke and D. Prosnitz, both applications being incorporated by reference herein.

Previous designs of free electron lasers have been almost exclusively one-dimensional, varying with the longitudinal axis coordinate Z, one exception being an earlier treatment by D. Prosnitz of transverse magnetic field variations in the FEL by using spatially averaged wiggler magnetic fields (Lawrence Livermore National Laboratory Internal Memo AL 79-303, Mar. 5, 1979). More realistically, the laser electric field $E_s$, the laser field phase angle $\phi_s$, the electron beam current density $J_s$ and the local wiggler magnetic field strength $B_w$ will vary as well with radial coordinate r and azimuthal coordinate $\theta$ in a cylindrical coordinate system $(r, \theta, Z)$. The usual synchronism of an electron beam representative particle can be maintained, at best, at only a single radial position; and lack of synchronism at all other radial positions will cause a drop in efficiency of electron trapping and, concomitantly, of energy conversion. Prior workers in the field appear to contemplate only on-axis design, whereby the radial position of synchronism is chosen to be $r=0$; this is a poor choice, replaced here by an optimum choice $r=r_d>0$.

The defining equations used here for energy conversion in the FEL are $$\frac{d\gamma}{dz} = \frac{-e_s b_w}{\gamma k_w} \sin\psi \quad (1)$$

$$\frac{d\psi}{dz} = k_w - \frac{k_s}{2\gamma^2}\left[1 + \frac{b_w^2}{k_w^2} - \frac{2b_w e_s}{k_w k_s}\cos\psi + \frac{e_s^2}{k_s^2}\right] + \frac{d\phi}{dz}, \quad (2)$$

and the Maxwell equations for the electromagnetic quantities $$\nabla^2 E_s - \frac{1}{c^2}\frac{\partial^2 E_s}{\partial t^2} = \frac{Z_o}{c}\frac{\partial J}{\partial t}, \quad (3)$$

The relevant variables and parameters are defined as follows:

$$\begin{aligned}
m &= \text{electron mass,} \quad (4)\\
e &= \text{electron charge,}\\
c &= \text{speed of light in vacuum,}\\
\gamma mc^2 &= \text{electron relativistic energy,}\\
e_s &= eE_s/\sqrt{2}\ mc^2,\\
b_w &= eB_w/\sqrt{2}\ mc,\\
\lambda_s &= 2\pi/k_s = 2\pi c/\omega_s = \text{wavelength of incident laser radiation,}\\
\lambda_w &= 2\pi/k_w = \text{local wavelength of wiggler field,}\\
\psi &= \int(k_s + k_w)dz - \omega_s t + \phi = \text{phase angle of wave moving with the incident radiation,}\\
\psi_s &= k_s z - \omega_s t + \phi_s\\
J &= \text{electron beam current density,}\\
Z_0 &= \text{free space impedance} = 377\ \text{ohms,}\\
f(\psi, \nu) &= \text{phase space density function,}\\
\langle g(\psi, \nu)\rangle &= \text{phase space average of } g(\psi, \nu), \text{ weighted by the phase space density function } f(\psi, \nu).
\end{aligned}$$

One often uses a so-called resonant electron $(d\psi_R/dz=0)$ as the representative particle, and from Equation (2) this requires that $$\gamma = \gamma_R, \quad (5)$$

$$\psi = \psi_R,$$

$$k_w - \frac{k_s}{2\gamma_R^2}\left[1 + \frac{b_w^2}{k_w^2} - \right.$$

-continued $$\left. \frac{2b_w e_s}{k_w k_s}\cos\psi + \frac{e_s^2}{k_s^2}\right] + \frac{d\phi}{dz} = 0,$$

One now assumes that the quantities $E_s$ and $\psi_s$, related by $$E = Re(E_s e^{i\psi_s}) = Re(E_s \exp\ i(k_s z - \omega_s t + \phi_s)), \quad (6)$$

$$J = Re(J_s e^{i\psi_s}),$$

vary sufficiently slowly with Z that second derivatives and products of first derivatives of these variables are small enough to be ignored, viz.

$$\frac{\partial^2 E_s}{\partial z^2},\ E_s\frac{\partial^2 \phi_s}{\partial z^2},\ \left(\frac{\partial E_s}{\partial z}\right)\left(\frac{\partial \phi_s}{\partial z}\right),\ E_s\left(\frac{\partial \phi_s}{\partial z}\right)^2 \approx 0. \quad (7)$$

With these approximations incorporated, Equation (3) becomes $$Re\left\{e^{i\psi_s}\left[i 2(\nabla_\perp E_s)\cdot(\nabla_\perp \phi_s) + E_s(\nabla_\perp^2 \phi_s) + 2k_s\frac{\partial E_s}{\partial z} + \nabla_\perp^2 E_s - E_s(\nabla_\perp \phi_s)^2 - 2k_s E_s\frac{\partial \phi_s}{\partial z}\right]\right\} = \frac{Z_o}{c}\frac{\partial J}{\partial t}, \quad (8)$$

$$\nabla^2 = \nabla_\perp^2 + \frac{\partial^2}{\partial z^2}.$$

From Equations (1) and (2), one can determine the complex current density $J_s$ of the electron beam current that contributes to laser gain, viz.

$$J_s = \frac{-\sqrt{2}\ b_w J}{k_w}\left[<\frac{\cos\psi}{\gamma}>_r \sin\psi_s - <\frac{\sin\psi}{\gamma}>_r \cos\psi_s\right], \quad (9)$$

where $<g_r>$ denotes an electron average over phase space at a particular value of the radial coordinate r. If one replaces J by $J_s$ in Equation (8) and matches terms involving $\sin\psi_s$ and $\cos\psi_s$ in that equation, one infers the following equations:

$$2(\nabla_\perp E_s)\cdot(\nabla_\perp \phi_s) + E_s(\nabla^2 \phi_s) + 2k_s\frac{\partial E_s}{\partial z} = \quad (10)$$

$$\sqrt{2}\ Z_o \frac{b_w k_s}{k_w} J <\frac{\sin\psi}{\gamma}>_r$$

$$-\nabla_\perp^2 E_s + E_s(\nabla_\perp \phi_s)^2 + 2k_s E_s\frac{\partial \phi_s}{\partial z} = \quad (11)$$

$$\sqrt{2}\ Z_o \frac{b_w k_w}{k_w} J <\frac{\cos\psi}{\gamma}>_r$$

These last two equations determine the evolution of the laser field variables $E_s$ and $\phi_s$ in the presence of the electrons and the wiggler magnetic field. These last two equations and Equations (1) and (2) are solved approximately by focusing attention on the motion of a representative electron and replacing the overall current density J by the "bunched" current density $J_\Lambda$ for electrons that follow the motion of the representative electron in the potential well. One now introduces the following additional definitions:

$$J_\Lambda = \frac{A_\Lambda J}{4\pi \Delta \gamma}, \quad (12)$$

$$A_\Lambda = \sqrt{\frac{4e_s b_w}{k_s^2} \int F(\psi, \psi_1) d\psi}$$

$$\Delta \gamma = \frac{1}{2}(\gamma_{max} - \gamma_{min}),$$

$$F(\psi, \psi_1) = [\cos\psi + \cos\psi_1 - (\pi - \psi - \psi_1)\sin\psi_1]^{\frac{1}{2}}.$$

The bunched current density $J_\Lambda$ should be approximately proportional to the number of electrons that follow the motion of the average electron in the potential well. One attractive choice for the representative electron is the resonance condition $\psi = \psi_r$ and $\gamma = \gamma_r$ indicated in Equations (5). Finally, one assumes that the bunched current density satisfies $$J_\Lambda \lesseqgtr J. \quad (13)$$

$$J_\Lambda(z + \Delta z) \lesseqgtr J_\Lambda(z),$$

and that the phase space averages over all electrons in Equation (9) may be replaced by averages over the full buckets so that $$<\frac{\cos\psi}{\gamma}> \to \frac{1}{\gamma_{avg}} \int \cos\psi \, F(\psi, \psi_{avg}) \, d\psi = \frac{<\cos\psi>}{\gamma_{avg}} \quad (14)$$

$$<\frac{\sin\psi}{\gamma}> \to \frac{1}{\gamma_{avg}} \int \sin\psi \, F(\psi, \psi_{avg}) \, d\psi = \frac{<\sin\psi>}{\gamma_{avg}}.$$

The approximations of Equations (14) give good estimates of FEL performance when only one-dimensional effects are considered, but the validity of these approximations in two-dimensional models is less obvious and often can be verified only a posteriori. One reason for this is that the resonance conditions of Equation (5) are strictly maintained at best only at one radial position (henceforth called the design radius $r_d$), and the approximations of Equations (14) are therefore fully justified only at $r = r_d$. Even in two dimensions, however, the resonant electron approximations do lead to realistic behavior of the source terms in Equations (10) and (11). If the field intensities are small, the bucket area decreases, leading to detrapping as expected. Lack of electron synchronism also leads to detrapping because $\psi_{avg}$ will become large and produce small F values (Eqs. 12) and thus small bucket areas. We therefore use the resonant electron model in two dimensions despite its limitations.

The defining equations are numerically solved for the representative electron at a particular radius; and the results of one such run, with parameter values shown in Table I for a preferred mode of the FEL, are shown in FIG. 1. FIG. 1(a) illustrates the growth of laser intensity I(Z) predicted by the one-dimensional model for conditions listed in Table I.

TABLE I

| Design Characteristics for 156 m Length Amplifier | | |
|---|---|---|
| | 1-Dimensional | 2-Dimensional |
| Laser Wavelength | 250 nm | 250 nm |

TABLE I-continued

| Design Characteristics for 156 m Length Amplifier | | |
|---|---|---|
| | 1-Dimensional | 2-Dimensional |
| $\gamma$ | 2150 | 2150 at design radius $r = r_d$ |
| $\Delta\gamma$ | 5.4 | 5.4 |
| $\lambda_w$ | 15 cm | 15 cm |
| $B_{in}$ | 3.8 kG | 3.8 kG at design radius $r = r_d$ |
| $J(r, z = 0)$ | 100 kA/cm$^2$ | 127 $e^{-(r/w_o)^5}$ kA/cm$^2$ |
| $i_e$ | 20 kA | 20 kA |
| $I(r, z = 0)$ | 8.3 GW/cm$^2$ | 16.6 $e^{-2(r/w_o)^2}$ GW/cm$^2$ (beam waist at amplifier entrance) |
| $w_o$ | — | .25 cm |
| $\psi_r$ | .4 | .4 |

Figure 2:
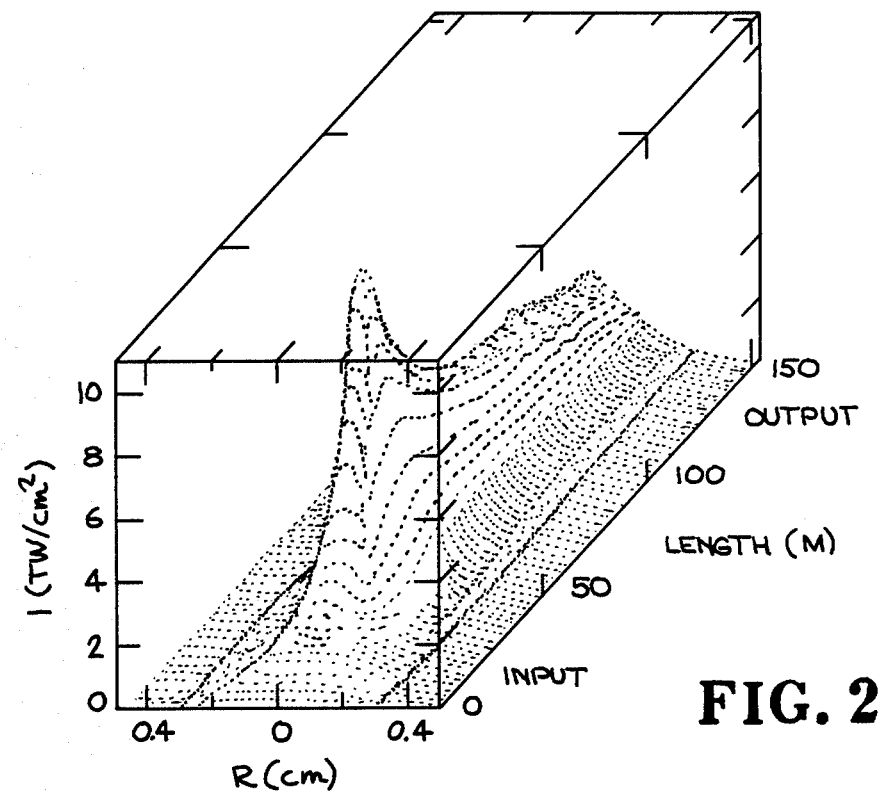
FIG. 2 is a graphic presentation of laser intensity I(r,z) for the two-dimensional FEL amplifier model of FIG. 1 with $r_d = 0$ cm.
Figure 3:
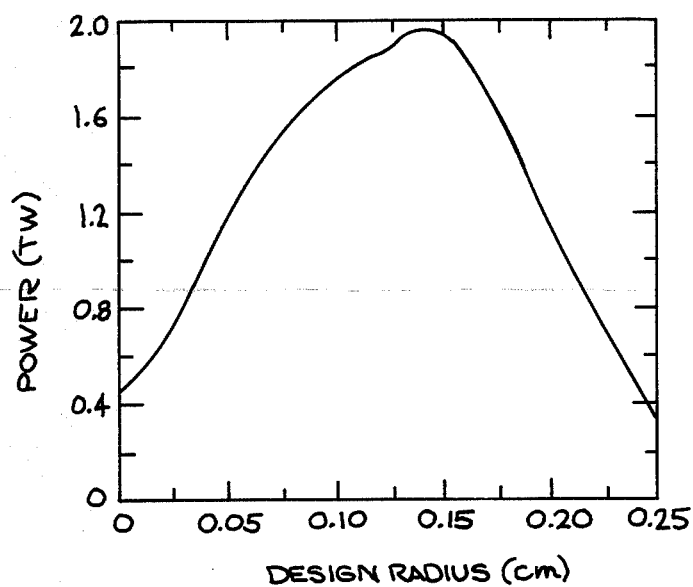
FIG. 3 is a graphic view of the power output of a 156 m length, $\lambda_s = 0.25$ μm FEL amplifier as a function of amplifier design radius $r_d$.

Here, the predicted (1D) output is 3.1 terrawatts (equals $\pi r^2 I$). FIGS. 1(b) and 1(c) illustrate the intensity I(r=0, Z) for the same initial conditions as 1(a), for the two-dimensional model with design radius $r_d = 0$ and $r_d = 0.175$ cm, respectively. FIG. 2 is a two-dimensional representation of laser intensity I(r,z) for the situation of FIG. 1(c) and illustrates even more clearly the deleterious peaking and subsequent sharp fall-off of such intensity at an intermediate length. For $r_d = 0$, the laser beam intensity I(r,z) (watts/cm$^2$) comes to a sharp peak and then decreases, indicating that the laser beam first focuses then defocuses; total output power is only 0.47 TW, which is rather low. Neither laser intensity nor $d\gamma/dz$ is the same for the one- and two-dimensional amplifier designs so that the final electron energy is also different for the two models. Predicted performance can, however, be compared approximately for different amplifiers using the figure of merit $$n_t = \frac{P_o}{2 \, mc^2(\gamma_{initial} - \gamma_{final}) \, i_e} \quad (15)$$

where $P_o$ is laser output power and $i_e$ is initial electron beam current; $\eta_t$ is a measure of amplifier trapping efficiency, and one finds $\eta_t = 0.41$ and $\eta_t = 0.06$ for the one- and two-dimensional models, respectively ($r_d = 0$). The reduced performance predicted by the two-dimensional model with $r_d = 0$ arises from several factors: (1) the inhomogeneous magnetic field prevents electron synchronism between the buckets and the electrons located off-axis; (2) the effective focusing of the laser field reduces the off-axis bucket size; (3) the sharply peaked laser field creates large transverse differences in the $d\gamma/dz$ (as a function of radial coordinate r), and this in conjunction with the radial magnetic field variations results in beam detrapping and reduction of FEL efficiency; and (4) beam diffraction effects are manifest in a two-dimensional model (as in nature). Beam focusing results from two phenomena. First, the severe off-axis detrapping produces a gain medium of very small aperture so that the laser beam is effectively truncated (as a function of r) by the aperture, causing Fresnel interference patterns to develop. Second, on-axis beam trapping retards the laser beam on-axis relative to the laser beam edges, and this produces lens-like focusing. The beam detrapping boundary moves inward towards smaller r as the electrons propagate the length of the amplifier. The resulting reduction of gain aperture increases axial gain relative to beam edge gain and enhances both the Fresnel focusing and the lens-like focusing. Beam detrapping and focusing thus reinforce one another and the FEL performs poorly.

In effect, the system designed with $r_d > 0$ may manifest a larger effective beam aperture than the system designed with $r_d = 0$. A related effect here is the limit on system length imposed by diffraction effects. A monochromatic optical beam of diameter D and wavelength $\lambda$ has a measure of diffraction $\lambda/D$, and if this measure is to be no greater than the half angle $D/2L$ subtended by a beam of length L, beam length is limited by $L < D^2/\lambda$; with, say, D = 1 cm and $\lambda = 10$ μm, this yields $L \lesssim 10M$, which is rather small for efficient extraction of electron beam energy.

Figure 4:
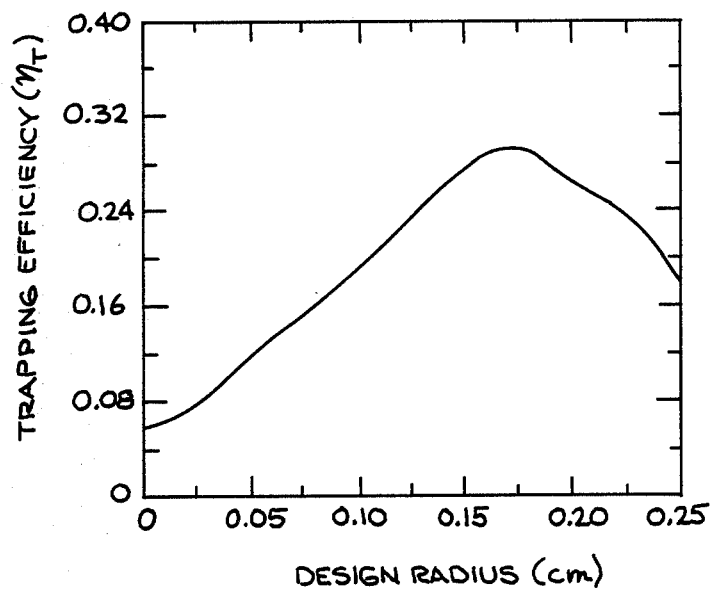
FIG. 4 is a graphic view of trapping efficiency $\eta_t$ for a 156 m length, $\lambda_s = 0.25$ μm FEL amplifier as a function of amplifier design radius $r_d$.
Figure 5:
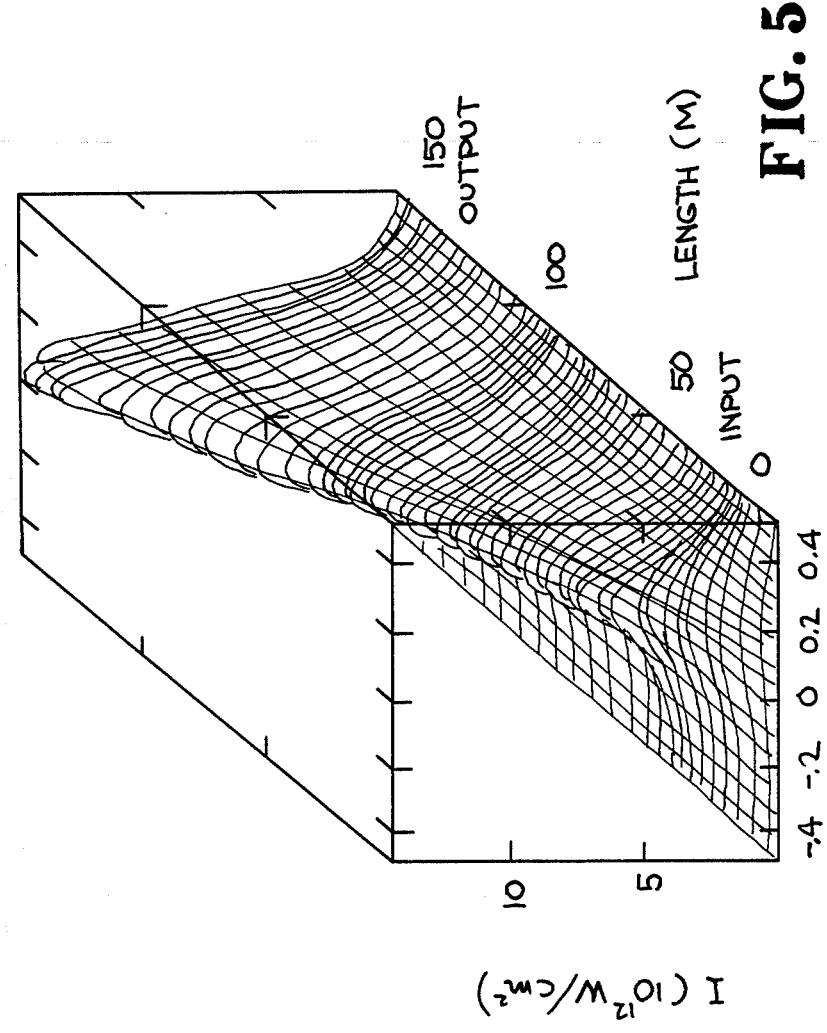
FIG. 5 is a graphic view of laser intensity I(r,z) for a 156 m length, $\lambda_s = 0.25$ μm FEL amplifier with $r_d = 0.175$ cm, with the remaining parameters being the same as those of FIG. 2.

These problems are partly avoided by designing the FEL for off-axis synchronism (i.e., at $r = r_d > 0$). This (re)design has been carried through for a choice $r_d = 0.175$ cm (outer beam diameter $r_b = 0.25$ cm), with all other parameters chosen as in Table I. The results, shown in FIG. 5, are dramatically improved vis-a-vis the zero design radius behavior shown in FIG. 2, as electron beam detrapping now occurs only near $r = r_b$. FIG. 4 presents the results of a study of trapping efficiency as a function of design radius $r_d$. From other considerations involved in the beam emittance for a planar wiggler, one can estimate the radius $r_s$ (less than $r_b$) over which beam synchronism can be achieved, viz.

$$r_s = \left[\frac{2\Delta\gamma}{\gamma}\left(\frac{1}{b_w^2} + \frac{1}{k_w^2}\right)\right]^{\frac{1}{2}}$$

where $(\Delta\lambda) mc^2$ is the electron beam energy spread that the amplifier is designed to trap. If one chooses $r_d \approx r_s$, one can trap over a large aperture (diameter = $2\sqrt{2} r_s$) and performance is improved. The optimum design radius may not be precisely $r_s$ because more current flows at larger radii and therefore detrapping in the center of the beam is less detrimental than detrapping at the beam edges.

FIG. 4 graphically presents FEL amplifier trapping efficiency $\theta_t$ as a function of design radius $r_d$. Clearly, off-axis designs are more efficient, and the best amplifier performance for our test case is achieved with $r_d \approx 0.175$ cm, which is $r_d \approx r_b/\sqrt{2}$. With a design radius $r_d = r_b/\sqrt{2}$, the design radius divides the electron beam area into two equal size configurations; favorable behavior for this choice of $r_d$ may reflect the optical beam diffraction reduction effect discussed earlier. For this design, the trapping efficiency is found to be $\theta_t = 0.32$ or more than five times as large as that achieved with the on-axis design. For this choice of design radius, one notes that $I(r,z)$ in FIG. 2 increases more or less monotonically for $0 < Z < 130$ m, in contrast to the sharp peaking and subsequent decrease in intensity manifested in FIG. 2 with $r_d = 0$.

Based on our approximate method of handling the two-dimensional FEL equations of motion, introduction of two-dimensional effects significantly alters the one-dimensional predictions. But our modeling procedure still predicts large amplifier gains with off-axis design, although refractive focusing and Fresnel interference will lead to detrapping and thus will limit the performance somewhat as compared to a strictly one-dimensional FEL design.

The foregoing description of a preferred embodiment of the invention is presented for purposes of illustration only and is not intended to limit the invention to the precise form disclosed; modification and variation may be made without departing from what is regarded as the scope of the invention. Specifically, although the calculations have been carried out for one- and two-dimensional free electron laser models, this invention applies to all three dimensional free electron laser concepts.

We claim:

1. A method for amplification of the optical radiation of predetermined wavelength $\lambda_s = 2\pi/k_s = 2\pi c/\omega_s$ and local electric field strength $E_s = \sqrt{2} mc^2 e_s/e$, where e is the unit of electron charge and $\gamma mc^2$ is relativistic energy of an electron propagating along a predetermined z-axis, the method comprising the steps of:

providing a transverse wiggler magnetic field of alternating polarity along the predetermined z-axis, the magnetic field having local field strength $B_w = \sqrt{2} mc\, b_w/e$ and local period $\lambda_w = 2\pi/k_w$;

directing a collimated beam of electrons having relativistic energy $\gamma mc^2$ initially exceeding 2 MeV along the predetermined axis, in timed relationship with propagation of the optical radiation;

providing a substantially constant stable phase angle $\psi = \int (k_s + k_w)\, dz - \omega_s t + \phi_s$ associated with the electron beam so that $\psi$ substantially satisfies the relation $$\frac{d\psi}{dz} = k_w - \frac{k_s}{2\gamma^2}\left[1 + \frac{b_w^2}{k_w^2} - 2\frac{b_w e_s}{k_w k_s}\cos\psi + \frac{e_s^2}{k_s^2}\right] + \frac{d\phi_s}{dz} = 0$$

at a radius substantially $$r \approx r_d \approx \left[\frac{2\Delta\gamma}{\gamma}\left(\frac{1}{b_w^2} + \frac{1}{k_w^2}\right)\right]^{\frac{1}{2}},$$

measured transversely from the predetermined electron beam axis, where $(2\Delta\gamma)\, m_e c^2$ is the representative initial energy spread in the electron beam.

2. A method according to claim 1, wherein the wavelength $\lambda_s$ is substantially 250 nm, the initial relativistic energy factor $\gamma$ is substantially 2150, the magnetic field strength is substantially 3.8 kG, the magnetic field period $\lambda_w$ is substantially 15 cm, the stable phase angle $\psi$ is substantially 0.4 radians, and the laser beam has an initial radius of substantially 0.25 cm.

3. A method for amplification of the optical radiation of predetermined wavelength $\lambda_s = 2\pi/k_s = 2\pi c/\omega_s$ and local electric field strength $E_s = \sqrt{2} mc^2 e_s/e$, where e is the unit of electron charge and $\gamma mc^2$ is relativistic energy of an electron propagating along a predetermined z-axis, the method comprising the steps of:

providing a transverse wiggler magnetic field of alternating polarity along the predetermined z-axis, the magnetic field having local field strength $B_w = \sqrt{2} mc\, b_w/e$ and local period $\lambda_w = 2\pi/k_w$;

directing a collimated beam of electrons of radius $r_b$ having relativistic energy $\gamma mc^2$ initially exceeding 2 MeV along the predetermined axis, in timed relationship with propagation of the optical radiation;

providing a substantially constant stable phase angle $\psi = \int (k_s + k_w)\, dz - \omega_s t + \phi_s$ associated with the electron beam so that $\psi$ substantially satisfies the relation $$\frac{d\psi}{dz} = k_w - \frac{k_s}{2\gamma^2}\left[1 + \frac{b_w^2}{k_w^2} - 2\frac{b_w e_s}{k_w k_s}\cos\psi + \frac{e_s^2}{k_s^2}\right] +$$

$$\frac{d\phi_s}{dz} = 0.$$

at a radius substantially $r = r_b/\sqrt{2}$, measured transversely from the predetermined electron beam axis.

4. A method according to claim 3, wherein the wavelength $\lambda_s$ is substantially 250 nm, the initial relativistic energy factor $\gamma$ is substantially 2150, the magnetic field strength is substantially 3.8 kG, the magnetic field period $\lambda_w$ is substantially 15 cm, the stable phase angle $\psi$ is substantially 0.4 radians, and the laser beam has an initial radius of substantially 0.25 cm.

5. A method for amplification of the optical radiation of predetermined wavelength $\lambda_s = 2\pi/k_s = 2\pi c/\omega_s$ and local electric field strength $E_s = \sqrt{2}\, mc^2\, e_s/e$, where e is the unit of electron charge and $\gamma mc^2$ is relativistic energy of an electron propagating along a predetermined z-axis, the method comprising the steps of:

providing a transverse wiggler magnetic field of alternating polarity along the predetermined z-axis, the magnetic field having local field strength $B_w = \sqrt{2}\, mc\, b_w/e$ and local period $\lambda_w = 2\pi/k_w$;

directing a collimated beam of electrons having relativistic energy $\gamma mc^2$ initially exceeding 2 MeV along the predetermined axis, in timed relationship with propagation of the optical radiation;

providing a substantially constant stable phase angle $\psi = \int (k_s + k_w)\, dz - \omega_s t + \phi_s$ associated with the electron beam so that $\psi$ substantially satisfies the relation $$\frac{d\psi}{dz} = k_w - \frac{k_s}{2\gamma^2}\left[1 + \frac{b_w^2}{k_w^2} - 2\frac{b_w e_s}{k_w k_s}\cos\psi + \frac{e_s^2}{k_s^2}\right] + \frac{d\phi_s}{dz} = 0$$

at a particular radius $r = r_d > 0$, measured transversely from the predetermined electron beam axis, with $r_d$ being determined by substantially maximizing the electron trapping efficiency $\eta_t$ defined by $$\eta_t = \frac{P_o}{2(\gamma_{initial} - \gamma_{final})\, mc^2\, i_e}$$

where $P_o$ is laser output power, $(\Delta\gamma)mc^2$ is representative $\gamma_{initial} - \gamma_{final}$, and $i_e$ is initial electron beam current.

6. A method according to claim 5, wherein the wavelength $\lambda_s$ is substantially 250 nm, the initial relativistic energy factor $\gamma$ is substantially 2150, the magnetic field strength is substantially 3.8 kG, the magnetic field period $\lambda_w$ is substantially 15 cm, the stable phase angle $\psi$ is substantially 0.4 radians, and the laser beam has an initial radius of substantially 0.25 cm.

* * * * *